C. C. COLEMAN.
Extension Key.
No. 200,512. Patented Feb. 19, 1878.
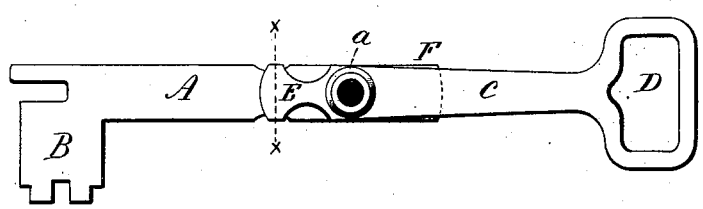
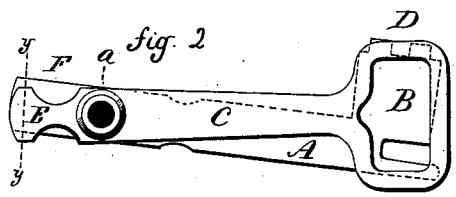
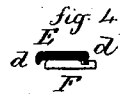

UNITED STATES PATENT OFFICE.

CORNELIUS C. COLEMAN, OF BRANFORD, CONNECTICUT, ASSIGNOR TO BRANFORD LOCK WORKS, OF SAME PLACE.

IMPROVEMENT IN EXTENSION-KEYS.

Specification forming part of Letters Patent No. 200,512, dated February 19, 1878; application filed January 24, 1878.

*To all whom it may concern:*

Be it known that I, CORNELIUS C. COLEMAN, of Branford, in the county of New Haven and State of Connecticut, have invented a new Improvement in Extension Door-Keys; and I do hereby declare the following, when taken in connection with the accompanying drawings and the letters of reference marked thereon, to be a full, clear, and exact description of the same, and which said drawings constitute part of this specification, and represent, in—

Figure 1, side view of the key extended; Fig. 2, side view of the key folded; Figs. 3 and 4, transverse sections.

This invention relates to an improvement in that class of door-keys which are constructed with a jointed spindle and so that the bit will fold toward the bow for the purpose of contracting the key when not required for use, in that condition occupying no more space than shorter keys; and the invention consists in constructing the spindle in two parts, each substantially flat, one overlapping the other, and hinged together by a pivot through the two parts, one part extending beyond the pivot or hinge, and with a projection at each edge toward the other part, and so as to overlap the edges of the other part when the key is extended, and thereby sustain the key in that condition, the elasticity of the parts allowing the projections to pass over the surface either in opening or closing, and when closed the said projections in like manner serve to retain the parts in the closed condition, as more fully hereinafter described.

A is one part, constructed from thin metal, and with the bit B formed thereon or attached thereto; C, the second part, of a similar shape, and constructed with the usual bow D. The two parts are placed together and a pivot, $a$, passed transversely through them, so that the one part may be turned toward the other to contract the key, as seen in Fig. 2. The part C is constructed with an extension, E, on the opposite side of the pivot, and on this extension transverse projections $d$ are formed, preferably one at each side, as seen in Fig. 2, and turning toward the other part, A.

The material of which the key is constructed is sufficiently elastic to allow these slight projections to be easily forced on the surface of the other part, and so that when the two parts are open, as in Fig. 1, the said projections will fall one each side the part A, as seen in Fig. 3, and thus secure the two parts in the extended position.

To close or contract the key, apply sufficient power to the parts to force the projections away from their engagement with the part A, and turn the two parts together, as seen in Fig. 2.

To secure the parts in the closed or contracted position, the part A has an extension, F, on the opposite side of the pivot, and a like engagement made for one or more of the projections on the part C, as seen in Fig. 4.

Instead of the projections overlapping the edges, an indentation may be made in the surface of the part A for the engagement of the projections, as seen in Fig. 4.

I claim—

A door-key constructed in two parts, jointed together by a transverse hinge or pivot, the parts extending beyond the hinge, and one part constructed with projections toward the other part, and so as to engage the said other part, substantially as described.

CORNELIUS C. COLEMAN.

Witnesses:
HENRY MORTON,
WILLIAM REGAN.